Dec. 15, 1925.
D. H. SCHLAEGEL
1,566,231
ATTACHMENT FOR POTATO DIGGERS
Filed Sept. 27, 1921
5 Sheets-Sheet 2

Dec. 15, 1925.

D. H. SCHLAEGEL 1,566,231

ATTACHMENT FOR POTATO DIGGERS

Filed Sept. 27, 1921

5 Sheets-Sheet 3

D. H. Schlaegel
INVENTOR

BY Victor J. Evans
ATTORNEY

WITNESS:

Dec. 15, 1925.  1,566,231
D. H. SCHLAEGEL
ATTACHMENT FOR POTATO DIGGERS
Filed Sept. 27, 1921  5 Sheets-Sheet 4

D. H. Schlaegel
INVENTOR

BY Victor J. Evans
ATTORNEY

WITNESS:

Dec. 15, 1925.
D. H. SCHLAEGEL
1,566,231
ATTACHMENT FOR POTATO DIGGERS
Filed Sept. 27, 1921     5 Sheets-Sheet 5
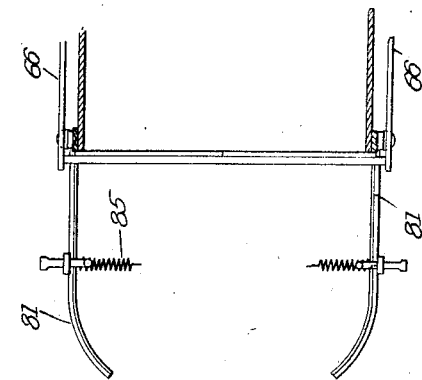
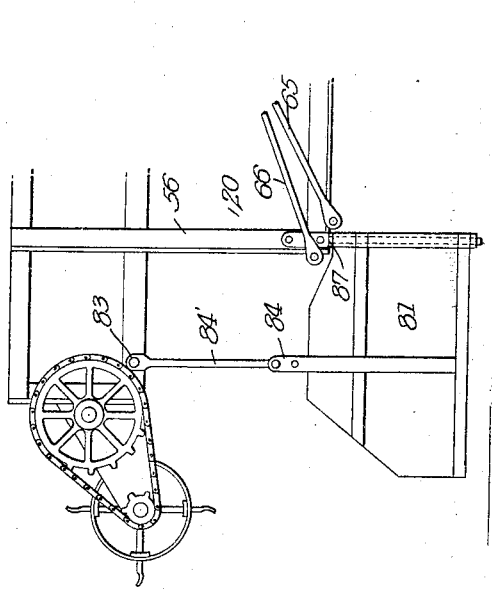
D. H. Schlaegel
INVENTOR Patented Dec. 15, 1925.

1,566,231

UNITED STATES PATENT OFFICE.

DANIEL H. SCHLAEGEL, OF COMPTON TOWNSHIP, OTTERTAIL COUNTY, MINNESOTA.

ATTACHMENT FOR POTATO DIGGERS.

Application filed September 27, 1921. Serial No. 503,565.

*To all whom it may concern:*

Be it known that I, DANIEL H. SCHLAEGEL, a citizen of the United States, residing in Compton Township, in the county of Ottertail and State of Minnesota, have invented new and useful Improvements in Attachments for Potato Diggers, of which the following is a specification.

This invention relates to an attachment designed especially for vining and bunching potatoes, and is intended for use with a digging machine, the attachment including a conveyor which receives the potatoes directly from the digger, removes the loose material and the vines and finally receives the potatoes in a receptacle from which they are dumped at intervals in piles or bunches.

One object is to collect potatoes from the digging machine in the manner specified, and to bunch them in order that they may be dried in the open air prior to storage.

Another object is to provide a machine which shall be moderate in cost, and shall be economical in operation, much of the labor involved in hand picking being eliminated.

A further object is to provide particular means for removing the vines, particular control of the dumping apparatus, and to provide for the return to the receiving box of any potatoes which have been carried by the conveyor beyond a given point, in the process of removing the vines.

With the foregoing and other objects in view, the invention consists in the details of construction, combination and arrangement of elements hereinafter described and claimed, it being understood that modifications may be made within the scope of the claims without departing from the spirit of the invention.

Figure 1:
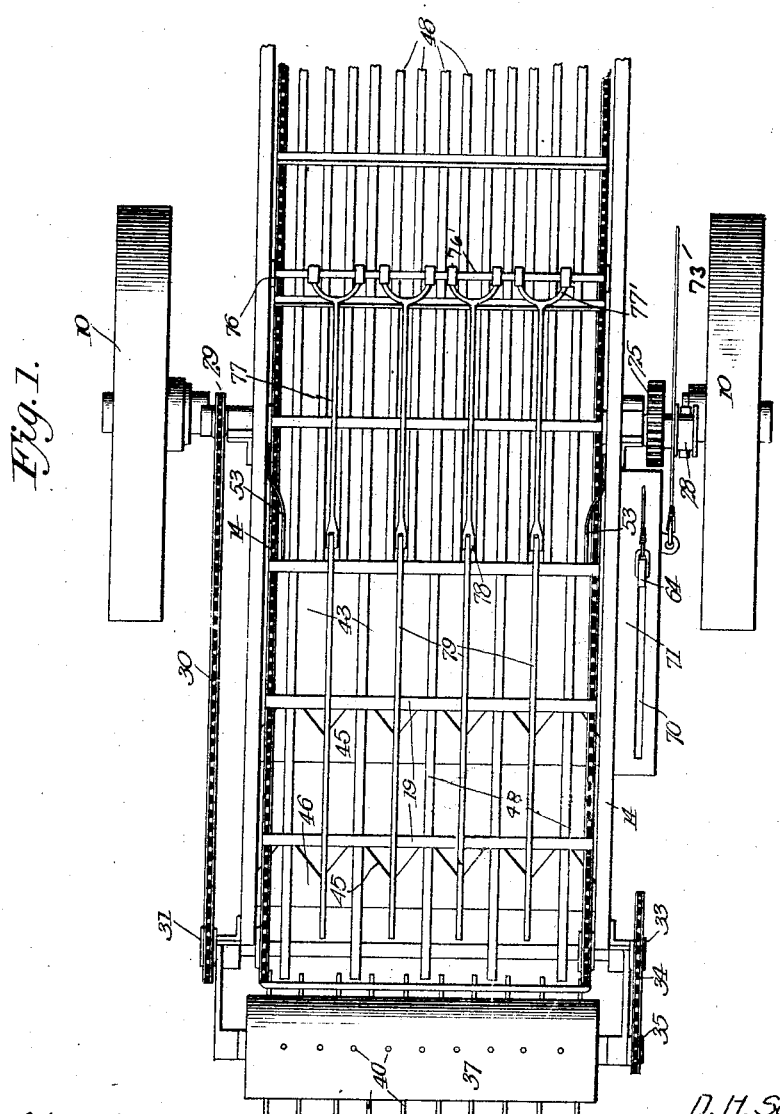
Figure 2:
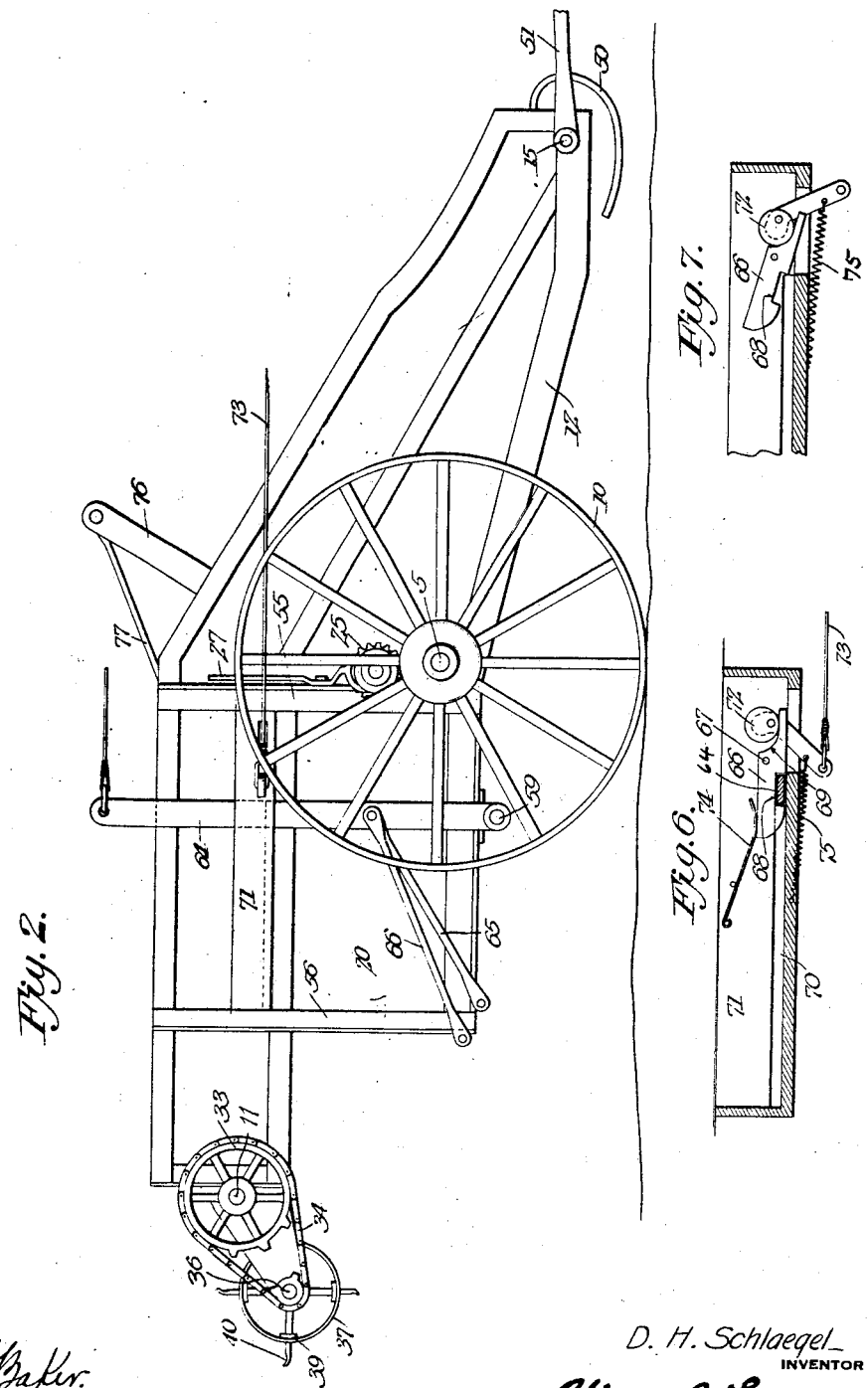
Figure 3:
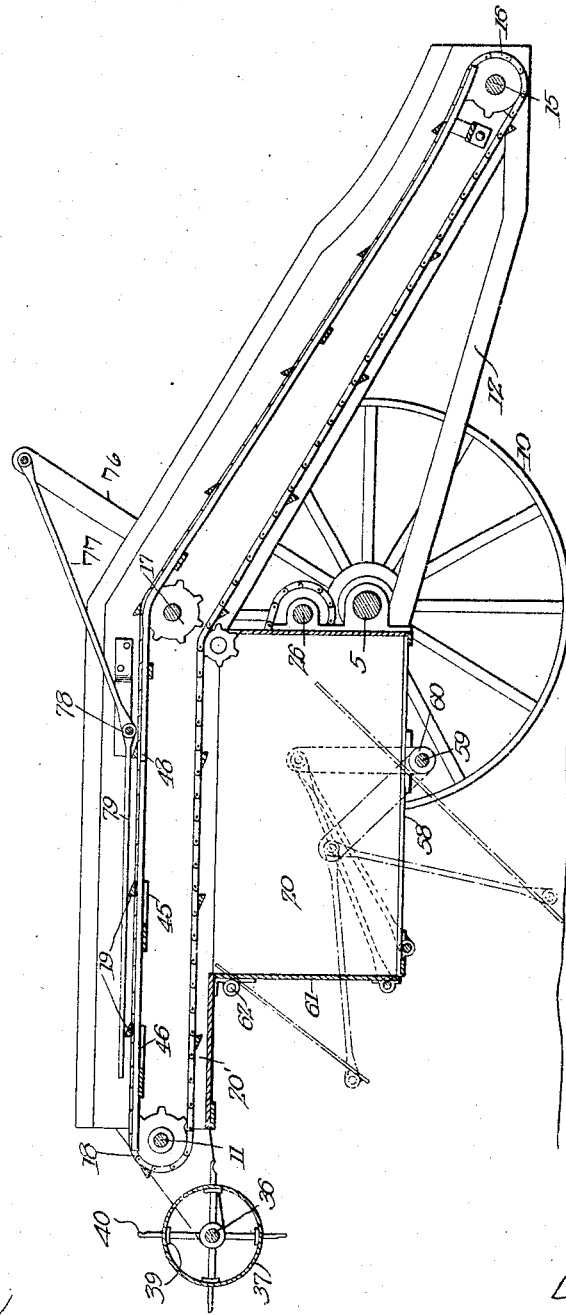
Figure 5:
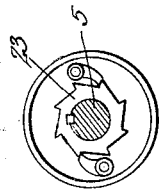
Figure 4:
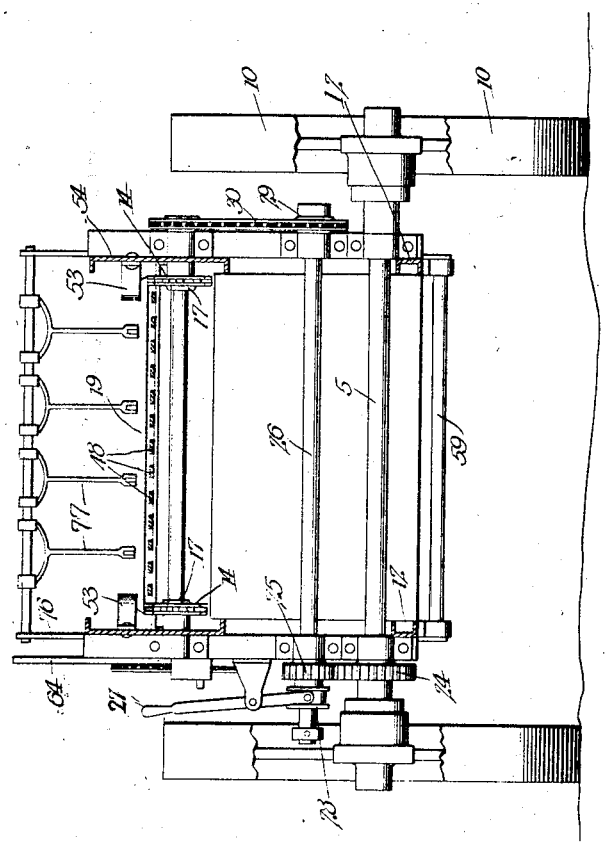

In the drawings, Figure 1 is a top plan view of the machine, Figure 2 is a view in side elevation, Figure 3 is a vertical longitudinal section, Figure 4 is a vertical transverse section, adjacent to the main axle, Figure 5 shows the ratchet mechanism between the main axle and the ground wheels, Figures 6 and 7 are detail views of the locking means for the lever controlling the dumping mechanism, Figure 8 is a fragmentary view in side elevation showing means for controlling the discharge of the potatoes from the receiving device, Figure 9 is a fragmentary view, in top plan, showing a portion of this attachment.

The machine is carried on ground wheels 10, the axle on which these wheels are mounted being designated 5. The frame includes the forwardly extending side bars 12, between the extreme ends of which is mounted a transverse shaft 15, this shaft constituting one of the shafts of the conveyor described below. The conveyor includes a plurality of chains 14 extending over sprocket wheels 16 on the shaft 13, and extending thence upwardly in an inclined direction over sprocket wheels 17, and thence in a horizontal direction to and around sprocket wheels 18 on the shaft 11. These chains are connected by transverse slats 19 which serve to move the product from the digging machine to a point about the receiving box 20, from which they are dumped at intervals in piles or bunches.

Ratchet mechanism 23 is interposed between the wheels 10 and the axle 5, and carried by this axle is a gear wheel 24 rigidly mounted and adapted to mesh with a gear wheel 25 on counter-shaft 26. The gear wheel 25 may be thrown out of mesh by means of the levers 27 which cooperate with the collar 28 carried by the gear wheel 25. The shaft 26 carries a sprocket wheel 29 having a chain 30, which in turn drives sprocket wheels 31 on the shaft 11, whereby movement is imparted to the conveyor.

On this shaft 11 is a sprocket wheel 33 driving a chain 34 passing around the sprocket wheel 35 mounted on the shaft 36 and driving a cylinder 37. This cylinder is of light metallic construction, being hollow and having a continuous circumferential wall, so that the vines will not become entangled as they are removed from the conveyor by the rotation of the cylinder. Transverse slats 39 are provided with spikes 40 for engaging the vines and removing the latter from the conveyor as the chains of the latter pass from the adjacent sprocket wheel. It is to be added that the slats just referred to, although extending transversely with reference to the path of movement of the conveyor, in fact extend longitudinally with reference to the axis of the cylinder 37.

As the potatoes are elevated by the conveyor and carried longitudinally of the machine, they reach the openings 43 between the bars 48 of Figure 1, much of the loose material having dropped off during the passage of the product over the bars beneath the conveyor. Some of the potatoes fall through the openings 43 into the receiving box 20, toward the rear end of the latter, and others to which vines are attached will pass to the viners 45 and 46, the vines being removed by engagement with these devices and the potatoes passing thence into the receptacle 20 or into the rear portion thereof designated 20'. Viners 45, 46 are shown in Figures 1 and 3 as being in the form of blades cut away to provide angular portions having somewhat the form of saw teeth, on an enlarged scale.

A grating below the conveyor is formed of spaced bars 48. The lower forward end of the conveyor is protected by a transverse shield 50 of the form shown in Figure 2, this shield protecting the conveyor from obstructions, which may be encountered in the path of travel of the machine. A draft element 51 connects the attachment with the digging machine, this device being connected with the forward portions of the elements 12 of the frame. Flat springs 53 project inwardly from the sides of the conveyor housing 54 and serve to guide the potatoes away from the sprocket chains.

The receiving box or receptacle for the potatoes, designated 20 includes uprights such as 55 at the forward portion and uprights 56 at the rear. This box may be of light metal construction, the frame work being sufficient to support the weight, and the doors referred to below may also be of metal.

The spaced bars 58 of the dumping bottom are carried by a transverse shaft 59 mounted in bearing blocks at 60. The rear door 61 is pivotally connected at 62 and these doors are controlled simultaneously by a lever 64 connected with the dumping bottom by an arm or rod 65, and connected with the rear door by a rod or arm 66. By shifting the lever 64, the doors are opened and the load is dumped.

The retaining and releasing device for the lever 64 is of special importance, and includes a hook 66 pivoted at 67 and provided with a recess 68 and a curved portion 69. The lever is received by the recess 68 and when the position of the hook is the same as shown in Figure 6, the lever is retained, the latter operating within the slot 70 in bracket 71. An element 72 of the form shown cooperates with the curved surface 69 of the hook, and when this element is thrown to release position by a pull on a flexible device such as 73, the hook 66 is permitted to move about its pivotal point and release the lever 64. A spring 74 engages one end of the hook, and a spring 75 serves the purpose indicated in the drawings, that is, normally holds member 72 in the position of Figure 6.

It may be added that the extension 20' of the receiving box is intended especially to receive the potatoes which have been carried beyond the usual point because of the vines connected therewith. Reference should also be made to upwardly extending posts 76 projecting from the housing of the conveyor and having connected with their upper ends transverse bar 76'. Mounted to swing from the latter by means of yokes 77' are the bars 77 extending longitudinally and connected by pivots as shown at 78 with the bars 79 also extending longitudinally but in a horizontal direction. The bars are intended to exert pressure on the vines in such manner as to prevent them being drawn downwardly when the potatoes on the vines are not easily separated.

In Figures 8 and 9, I have shown an attachment comprising means for controlling the discharge of potatoes from the box 20, the object being to cause the product to be deposited in rows or ridges instead of in an ordinary pile. This attachment includes wings or sides 81, suspended from the frame at the points 83, by means of straps 84, 84'. Tension spring 85 is secured by devices 86 and extends transversely between the straps, being designed to hold the wings in normal position and permit them to spread slightly as the potatoes are discharged. The wings depend from the sides of the box 20, being supported at 87, and the rear portions being deflected inwardly.

What is claimed:

1. In a device of the class described, a framework, a receptacle mounted therein, a conveyor mounted in the framework, for discharging material into the receptacle, vine removing devices extending across the conveyor, and independently movable bars extending parallel with and close to the conveyor, said bars each being pivotally mounted at one end and freely movable at the other end.

2. In a device of the class described, a framework, a receptacle mounted therein, a conveyor mounted in the framework, for discharging material into the receptacle, vine removing devices cooperating with the conveyor, independently movable bars extending close to the conveyor and each pivotally mounted at one end and freely movable at the other end, and an additional bar connected with each of the bars first named, at its pivotal point, said additional bars being connected with a stationary element.

In testimony whereof I affix my signature.

DANIEL H. SCHLAEGEL.